(12) United States Patent
Lashgari et al.

(10) Patent No.: US 12,705,358 B2
(45) Date of Patent: Aug. 11, 2026

(54) TIME-WINDOW BASED MULTI-STAGE SAMPLING

(71) Applicant: Oracle International Corporation, Redwood Shores, CA (US)

(72) Inventors: Kourosh Lashgari, Sammamish, WA (US); Prashanth Adhikari, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/622,482

(22) Filed: Mar. 29, 2024

(65) Prior Publication Data

US 2024/0370564 A1 Nov. 7, 2024

Related U.S. Application Data

(60) Provisional application No. 63/500,527, filed on May 5, 2023.

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC ............................ G06F 21/57; G06F 2221/034
See application file for complete search history.

(56) References Cited

U.S. PATENT DOCUMENTS

| | | | | |
|---|---|---|---|---|
| 10,404,448 | B2 | 9/2019 | Bucci et al. | |
| 12,536,202 | B1 | 1/2026 | Sahu et al. | |
| 2020/0382163 | A1 | 12/2020 | Kim et al. | |
| 2023/0123573 | A1 * | 4/2023 | Ahuja ..................... | G06F 17/18 707/725 |
| 2025/0190581 | A1 * | 6/2025 | Hosomi ................. | G09B 19/00 |

OTHER PUBLICATIONS

U.S. Appl. No. 19/012,556, Non-Final Office Action mailed Jun. 3, 2026, 11 pages.

* cited by examiner

*Primary Examiner* — Beemnet W Dada
(74) *Attorney, Agent, or Firm* — Kilpatrick Townsend & Stockton LLP

(57) ABSTRACT

A sampling approach for time-window based multi-stage sampling. The sampling system defines multiple time windows for sampling communications received by a computing system. The time windows are segmented into multiple time intervals. A portion of the multiple time intervals are randomly selected for sampling. A portion of the communications received during the selected time intervals are captured for security assurance purposes.

20 Claims, 12 Drawing Sheets

300

| | 302 Samples in Time Unit 2 | 304 Samples in Time Unit 4 | 306 Samples in Time Unit 6 | 308 Samples in Time Unit 7 |
|---|---|---|---|---|
| Samples within Time Unit | Samp-1 | Samp-1 | | Samp-1 |
| | Samp-2 | Samp-2 | | Samp-2 |
| | Samp-3 | | | Samp-3 |
| | Samp-4 | | | |
| | Samp-5 | | | |

| 5/8/2023 | 1 AM | 2 AM | 3 AM | 4 AM | 5 AM | 6 AM | 7 AM | 8 AM | 9 AM | 10 AM | 11 AM | 12 PM |
|---|---|---|---|---|---|---|---|---|---|---|---|---|
| | 15 | 24 | 20 | 32 | 36 | 38 | 45 | 60 | 55 | 47 | 44 | 70 |

404

| 5/15/2023 | 1 AM | 2 AM | 3 AM | 4 AM | 5 AM | 6 AM | 7 AM | 8 AM | 9 AM | 10 AM | 11 AM | 12 PM |
|---|---|---|---|---|---|---|---|---|---|---|---|---|
| | 5 | 32 | 10 | 20 | 27 | 45 | 58 | 72 | 70 | 68 | 42 | 50 |

406

| 5/22/2023 | 1 AM | 2 AM | 3 AM | 4 AM | 5 AM | 6 AM | 7 AM | 8 AM | 9 AM | 10 AM | 11 AM | 12 PM |
|---|---|---|---|---|---|---|---|---|---|---|---|---|
| | 10 | 28 | 15 | 26 | 32 | 42 | 52 | 66 | 63 | 58 | 43 | 60 |

FIG. 4

TIME-WINDOW BASED MULTI-STAGE SAMPLING

CROSS-REFERENCE TO RELATED APPLICATIONS

This application claims priority to U.S. provisional application No. 63/500,527, entitled "Time-Window Based Multi-Stage Sampling," filed on May 5, 2023, the disclosure of which is incorporated by reference herein in its entirety for all purposes.

BACKGROUND

Computer systems may receive many requests for operations to be performed. For example, servers may server multiple users where the server may receive a high number of requests from users. In some instances, the computer systems may be publicly accessible or accessible by potential bad actors. This presents a possible risk to unauthorized access and/or unauthorized requests to the computer systems.

Security assurance approaches have developed to attempt to address the risk of unauthorized access and/or unauthorized requests to the computer system. The legacy security assurance approaches are designed for particular characteristics of a system. Accordingly, the security assurance approach for a computer system is often selected based on the characteristics of the computer system. However, the characteristics of computer systems can often change, including characteristics outside of the control of an operator of the computer systems such as a number of requests received within time periods.

SUMMARY

The present disclosure relates generally to an approach for capturing data samples for security assurance, including cyber security, anomaly detection, observability, and compliance validation. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to a method for sampling communications for validation for security assurance. The method may include determining, by a system, a time window for validation, and segmenting, by the system, the time window into multiple time intervals. The method may further include randomly selecting, by the system, a set of time intervals from the multiple time intervals for sampling, and capturing, by the system, every k-th sample within the set of time intervals for validation.

An aspect of the present disclosure is directed to one or more computer-readable media having instructions stored thereon, wherein the instructions, when executed by a system, cause the system to determine a time window for validation, and segment the time window into multiple time intervals. The instruction, when executed by the system, may further cause the system to randomly select a set of time intervals from the multiple time intervals for sampling, and capture every k-th sample within the set of time intervals for validation.

An aspect of the present disclosure is directed to a system including memory to store samples and one or more processors coupled to the memory. The one or more processors may deter determine a time window for validation, and segment the time window into multiple time intervals. The one or more processors may further randomly select a set of time intervals from the multiple time intervals for sampling, and capture every k-th sample within the set of time intervals for validation.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

FIG. 3 illustrates an example captured sample representation in accordance with some embodiments.

FIG. 4 illustrates an example sampling estimation representation in accordance with some embodiments.

DETAILED DESCRIPTION

Figure 1:
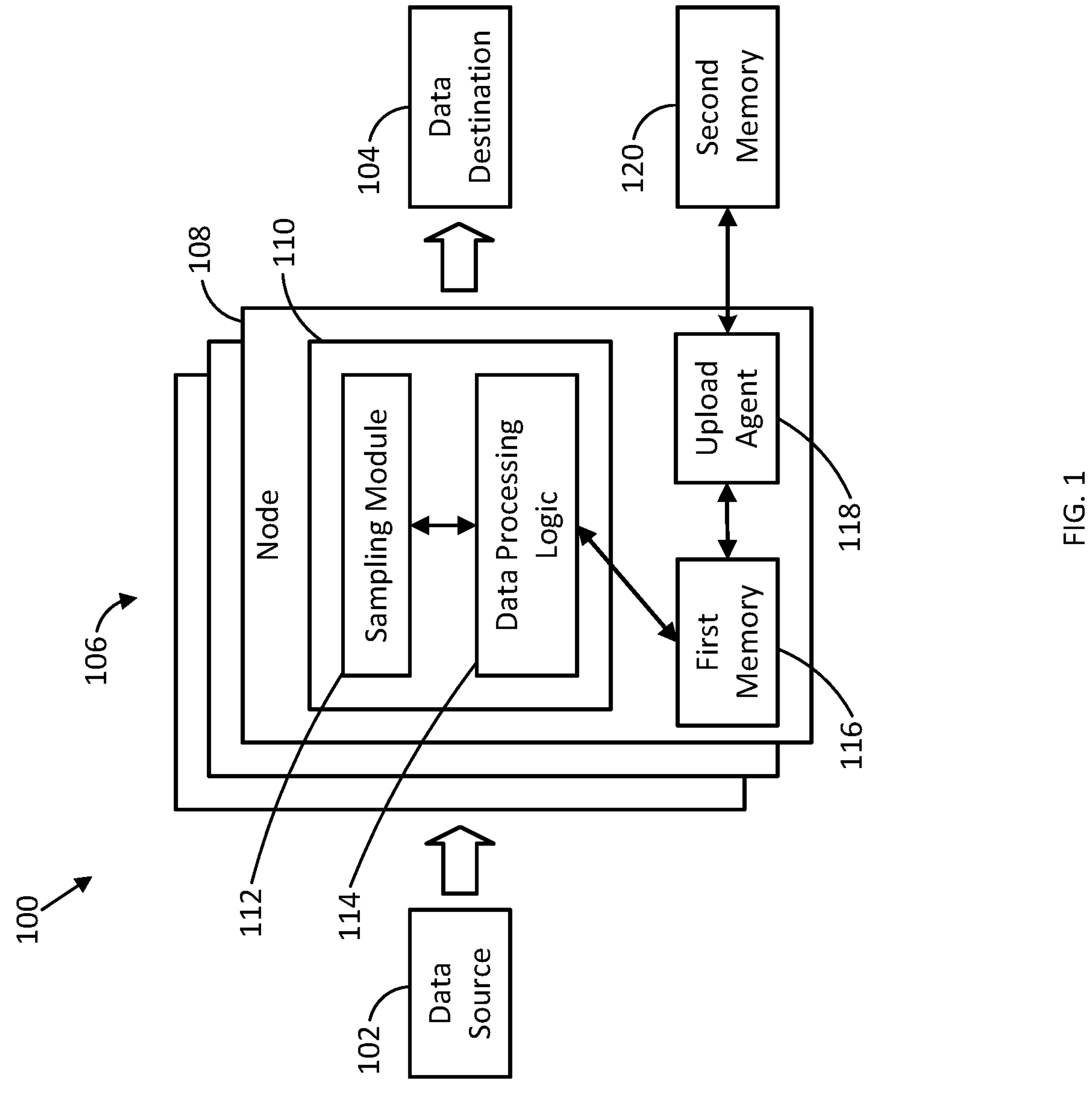
FIG. 1 illustrates a block diagram of an example system arrangement that can implement sampling approaches described herein in accordance with some embodiments.

In the following description, for the purposes of explanation, specific details are set forth in order to provide a thorough understanding of certain embodiments. However, it will be apparent that various embodiments may be practiced without these specific details. The FIGS. and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes approaches for capturing samples to be utilized for security assurance determinations for a computer system. More particular, approaches are provided for determining particular samples to be captured from a plurality of communications (such as requests) received by the computer system. Techniques are also described for determining how many samples are to be captured during time periods to provide desired security assurance.

A computer system can provide one or more services to one or more user systems. The user systems may provide communications (commonly referred to as traffic) to the computer system. A common concern exists in whether the communications from the user systems are authorized and/or whether the user systems providing the communications are authorized.

To address the concern of authorization, the computer system may perform security assurance procedures to verify that the communications and/or the user systems are authorized. In particular, the security assurance procedures may be utilized for identifying communications received from bad actors. Security assurance may provide a measure of confidence that the security features, practices, procedures, and architecture of a computer system accurately mediates and enforces a security policy.

In many instances, security assurance procedures include sampling communications that are received by the computer system from user systems. Performing security assurance includes having an approach to select communications to be sampled as the communications are received by the computer system. The approach to be utilized for selecting the communications to be sampled may depend on a rate of data flow from the communications passing through the computer system. However, the rate of data flow of the communications passing through computer system can vary.

Legacy approaches of selecting communications to sample were designed for certain rates of data flow of communications. For example, some approaches for selecting communications to sample were designed for high rates of data flow, which other approaches for selecting communications to sample were designed for low rates of data flow. However, as the rates of data flow within the system varied these legacy approaches were unable to adequately address the rates of data flow. Accordingly, these legacy approaches often result in inadequate security assurance.

As described herein, new approaches of selecting communications for sampling for security assurance. For example, a time to be utilized for validation may be divided into multiple time windows. In some embodiments, the time windows may be equally sized, such that each of the time windows covers an equal duration of time. Each of the time windows may be segmented into multiple time intervals. The time intervals may be equally sized, such that each time intervals covers an equal duration of time.

A certain percentage of the time intervals may be selected to be utilized for capturing samples of communications received by the computer system. The time intervals may be randomly selected. Based on the time intervals being randomly selected, the particular time intervals being selected for capturing samples may be different for different time windows. The different time intervals being randomly selected within the different time windows for capturing the samples may provide for less predictability in determining which communications are going to be utilized for sampling. This lack of predictability can make it tougher for bad actors to avoid sampling with their communications.

A number of samples to be collected can be determined based on a defined margin of error for the security assurance. Based on the total number of samples to be collected, a number of samples to be collected from each time interval may be determined. The number of samples to be collected from each time interval may be equal. Every k-th communication within each of the time intervals may be captured as samples to capture the number of samples from the time intervals. However, since the data flow of the communications in each of the time intervals may vary, the k-value for the capturing of samples may be different for each time interval. The k-value for the time intervals may be determined based on historical data flow. For example, a previous time interval related to a time interval may be identified, such as a previous time interval on a same day of the week and/or during a same time of day as the time interval. A number of communications to be received during the time interval may be estimated based on the number of communications received during the identified previous time interval. The k-value for the time interval may be determined based on the estimated number of communications to be received during the time interval. Using the estimated numbers of communications to determine the k-values may compensate for variances in the numbers of communications received between the time intervals while having an adequate number of samples captured for the security assurance. Accordingly, the approaches described herein may provide improved sampling for security assurance, including for systems with variances in the number of communications received by the system over time.

FIG. 1 illustrates a block diagram of an example system arrangement 100 that can implement sampling approaches described herein in accordance with some embodiments. For example, the system arrangement 100, or portions thereof, may be implemented in or coupled to a computer system, where the system arrangement 100 may capture samples for security assurance.

The system arrangement 100 may include a data source 102. The data source 102 may comprise an element that provides communication to a computer system, or some portion thereof. For example, the data source 102 may comprise a user device and/or a routing device that provides communications to the computer system in some embodiments. In other embodiments, the data source 102 may comprises an element of the computer system that receives the communications provided to the computer system and provides the communications to another element of the computer system.

The system arrangement 100 may include a data destination 104. The data destination 104 may be a destination for communications sent by the data source 102. For example, in instances where the data source 102 is the user device and/or the routing device, the data source 102 may comprise the computer system that is to receive the communications. In instances where the data source 102 is the element of the computer system, the data destination 104 may be the element of the computer system that is to receive the communications.

The system arrangement 100 may include a sampling system 106. The sampling system 106 may include one or more nodes to perform sampling of the communications being transmitted from the data source 102 to the data destination 104. The system arrangement 100 includes a first node 108. The first node 108 may be representative of other nodes within the sampling system, where the other nodes may include one or more of the features of the first node 108. The first node 108 may receive the communications, or some portion thereof, transmitted from the data source 102 to the data destination 104.

The node 108 may include a data processing channel 110. The data processing channel 110 may be responsible for managing a homogenous stream of data. For example, the data processing channel 110 may receive the communications transmitted the data source 102 to the to the data destination 104. The data processing channel 110 may receive the communications from the data source and perform processing with the communications for sampling performance. The data processing channel 110 may provide then provide the received communications to the data destination 104.

The data processing channel 110 may include a sampling module 112. The sampling module 112 may define which communications are to be captured as samples. For example, the sampling module 112 may be store a window duration, a total interval count, a chosen interval count, a success maximum count, a fail maximum count, and a skip maximum count. The window duration may define a time window that is to be sampled. The total interval count may define a number of time intervals in which the time window is to be divided. The chosen interval count may define a number and/or a percentage of the time intervals to be selected for sampling. The success maximum count may define a maximum number of samples to be captured per time interval. The fail maximum count may define a minimum number of samples to be captured per time interval. The skip maximum count may define a maximum number of intervals that may be skipped in sampling.

The sampling module 112 may define time windows based on the window duration. For example, the sampling module 112 may define when a current time window is to start and end based on the window duration. Further, the sampling module 112 may segment the time windows into multiple time intervals based on the total interval count. For example, the sampling module 112 may segment the current time window into a number of time intervals defined by the total interval count. The time intervals may be indexed, such as being indexed 1 to n, where n is the last interval in the time window. The sampling module 112 may then select time intervals for sampling based on the chosen interval count. For example, the sampling module 112 may select a certain number and/or percentage of the time intervals from which the communications will be sampled.

The time intervals may be randomly selected at the start of each time window. The sampling module 112 may receive a time as an input. The sampling module 112 may determine whether the time corresponds to one of the selected time intervals. In particular, the sampling module 112 may determine whether the time received is within one of the selected time intervals. If the sampling module 112 determines that the time corresponds to one of the selected time intervals, the sampling module 112 may output an indication that sampling of the communications is to be performed. If the sampling module 112 determines that the time does not correspond with one of the selected time intervals (for example, the time is outside of the selected time intervals), the sampling module 112 may output an indication that the sampling of the communications is not to be performed. The sampling module 112 may be continually provided with the time and may update the output accordingly.

The data processing channel 110 may include a data processing logic 114. The data processing logic 114 may receive the communications from the data source 102. Further, the data processing logic 114 may receive the indication of whether sampling is to be performed from the sampling module 112. In the instance where the sampling module 112 indicates that sampling is not to be performed (e.g., the time does not correspond to the selected time intervals), the data processing logic 114 may pass the communications to the data destination 104 without capturing samples.

In the instance where the sampling module 112 indicates that sampling is to be performed, the data processing logic 114 may perform sampling operations with the communications received from the data source 102 prior to providing the communications to the data destination 104. The sampling operations performed by the data processing logic 114 may include capturing every k-th communication as a sample as the k-th communication is being passed through the sampling system 106 to the data destination 104. The data processing logic 114 may determine a value of k for the k-th communication for a particular selected time interval, where the value of k for each selected time interval may be different. For example, the data processing logic 114 may identify one or more previous time intervals that correspond to selected time interval. The previous time intervals may correspond to the selected time interval by being a same time of day on a previous date as the selected time interval, being a same day of the week on a previous date as the selected time interval, being a same date of a previous year as the selected time interval, and/or any other previous time interval that an operator indicates as being corresponding to the selected time interval. The data processing logic 114 may determine the number of communications received during each of the previous time intervals and may estimate a number of communications to be received during the selected time interval based on the number of communications received during each of the previous time intervals. The data processing logic 114 may determine a value of k for the selected time interval based on the estimated number of communications to be received during the selected time interval and the number of samples to be captured during the time interval.

The data processing logic 114 may begin capturing the communications as samples based on receiving the indication from the sampling module 112 that sampling is to be performed. The data processing logic 114 may capture the sample in real-time, such that the communications to be sampled can be determined as the communications pass through the sampling system 106 rather than storing all of the communications passing through the sampling system 106 and determining which samples to capture at a later time. This real-time sampling approach may utilize less memory than having to store all of the communications for processing, which can allow the system to have less resources than if all of the communications had to be stored for a period of time.

The data processing logic 114 may capture a first communication (which may be a first communication in a selected time interval) received from the data source 102 after receiving the indication that sampling is to be performed as a first sample. The data processing logic 114 may then capture every k-th communication after the first sample as additional samples. For example, the data processing logic 114 may monitor the communications being passed through sampling system 106 and keep a count of the communications passing through the sampling system 106. Upon determining that a communication is a k-th communication, the data processing logic 114 may capture the communication as a sample.

The node 108 may include a first memory 116. The first memory 116 may be utilized for storing the captured samples in the node 108. The data processing logic 114 may provide the captured samples to the first memory 116 for storage.

The data processing logic 114 may maintain a count of samples captured within a selected time interval. For example, the data processing logic 114 may increment a count each time that a new sample is captured within a selected time interval. The data processing logic 114 may provide the count to the sampling module 112. The sampling module 112 may compare the count to the value of the success maximum count. The success maximum count may be greater than or equal to number of samples to be captured during the selected time interval for the security assurance. If the sampling module 112 determines that the count is greater than or equal to the value of the success maximum count, the sampling module 112 may change the output indication to indicate that sampling is not to be performed. The data processing logic 114 may stop capturing samples during the selected time interval based on the indications that the sampling is not to be performed received from the sampling module 112. By stopping the data processing logic 114 from capturing additional samples once the value of the success maximum count has been reached, the sampling system 106 may prevent the data processing logic 114 from capturing significantly more samples than desired for the security assurance, which would cost memory for storing the additional samples that would not be required for the desired security assurance. This can compensate for selected time intervals where significantly more communications are received than estimated.

When the sampling module 112 determines that a current time corresponds to an ending time of selected time interval for which sampling is being performed, the sampling module 112 may compare the count of captured samples received from the data processing logic 114 with the value of the fail maximum count. In particular, the sampling module 112 may compare the number of samples captured during a selected time interval with a value of the fail maximum count. The value of the fail maximum count may be less than the number of samples to be captured for security assurance. If the sampling module 112 determines that the number of sample captured during a selected time interval is less than or equal to the value of the fail maximum count, the sampling module 112 may determine that not enough samples were captured during the selected time interval for the security assurance. Based on the determination that not enough sample were captured during the selected time interval, the sampling module 112 may determine to skip the selected time interval. By skipping the selected time interval, the sampling module 112 may determine that the samples from the particular selected time interval are not to be utilized for the security assurance and that a next unselected time interval should then be selected to replace the selected time interval which did not have enough sample captured.

The sampling module 112 may maintain a count of a number of selected time intervals that were skipped for not capturing enough samples. In some embodiments, the number of selected time intervals skipped that is maintained by the sampling module 112 may be a number of concurrently selected time intervals that were skipped. The sampling module 112 may compare the number of selected time intervals that were skipped with the value of the skip maximum count. If the sampling module 112 determines that the number of selected time intervals that were skipped is greater than or equal to the value of the skip maximum count, the sampling module 112 may determine that the samples captured during the time window are not to be used for security assurance. For example, having more selected time intervals skipped than the value of the skip maximum count may indicate that there is some issue with the data source 102 and/or the data destination 104 that is causing communications to not be properly transmitted to the data destination 104. In particular, there may be a hardware error, network error, software error, or other computer error that is causing communications not to be received by the data destination 104. Therefore, the sampling module 112 may determine that the time window is not adequate for security assurance. Once the sampling module 112 has determined that the time window is not adequate, the sampling module 112 may continue to indicate that sampling is not to be performed for the rest of the time window, so that processing and/or sampling that are not to be used for security assurance will not be performed for the reminder of the time window, thereby not utilizing resources for samples that will not be used. The sampling module 112 may begin at the next time window with determining time intervals to be selected for sampling.

The node 108 may include an upload agent 118. Further, the system arrangement 100 may include a second memory 120. The second memory 120 may be located outside of the sampling system 106. The upload agent 118 may receive the captured samples from the first memory 116 and provide the captured sampled to the second memory 120. The samples may be retrieved from the second memory 120 to be utilized for security assurance purposes.

Figure 2:
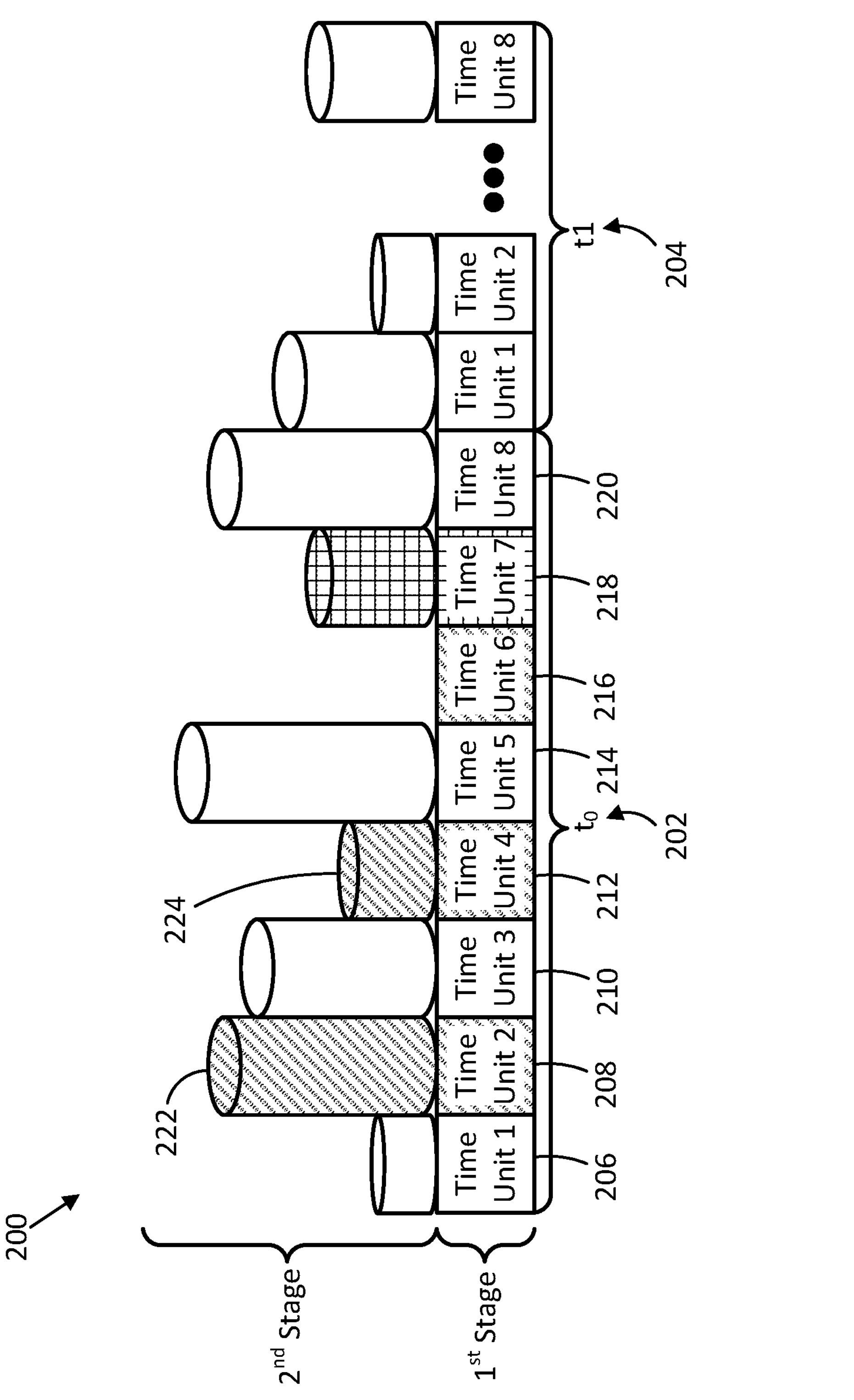
FIG. 2 illustrates an example sampling arrangement in accordance with some embodiments.

FIG. 2 illustrates an example sampling arrangement 200 in accordance with some embodiments. In particular, the sampling arrangement 200 illustrates an example of time windows, time intervals, and samples that may be captured by a sampling system, such as the sampling system 106 (FIG. 1).

The sampling arrangement 200 may include one or more time windows. For example, the sampling arrangement 200 includes a first time window 202 and a second time window 204. The time windows may be a defined period of time that can be utilized for security assurance. A sampling module (such as the sampling module 112 (FIG. 1)) may define the time windows.

The time windows may be segmented into a plurality of time intervals. For example, the first time window 202 is segmented into a first time interval 206, a second time interval 208, a third time interval 210, a fourth time interval 212, a fifth time interval 214, a sixth time interval 216, a seventh time interval 218, and an eighth time interval 220 in the illustrated embodiment. The sampling module may segment time windows into the time intervals. The sampling module may segment the time windows into a defined time intervals, where each of the time intervals are the same size.

In a first stage, certain time intervals within a time window may be randomly selected for sampling. The sampling module may select the time intervals for sampling based on a number of time intervals and/or a percentage of time intervals to be selected. In the illustrated embodiment, the second time interval 208, the fourth time interval 212, and the sixth time interval 216 initially selected for sampling, as indicated by the diagonal lines in FIG. 2.

In a second stage, communications within the selected time intervals may be sampled. For example, data processing logic (such as the data processing logic 114 (FIG. 1)) may sample communications received during the selected intervals. The communications received during the time intervals are represented by the bars above the time intervals in FIG. 2. For example, samples received during the second time interval 208 are represented by bar 222, and samples received during the fourth time interval 212 are represented by bar 224 in the illustrated embodiment. The data processing logic may determine which of the communications to sample and store the sampled communications. The data processing logic may capture the first sample received within a selected time interval and every k-th sample within the selected time interval.

In the illustrated embodiment, the computer system does not receive any communications during the sixth time interval 216, as illustrated by no bar being located above the sixth time interval 216. Based on no communications being received during the sixth time interval 216, the sampling module may determine that the sixth time interval 216 is to be skipped, as described in relation to the system arrangement 100. Due to the sixth time interval 216 being skipped, the sampling module may determine that the next non-selected time interval is to have communications sampled for security assurance. Accordingly, the seventh time interval 218 may be selected for sampling (as indicated by the cross-hatching in FIG. 2) based on the sixth time interval 216 being skipped. The data processing logic may capture the first communication and every k-th communication of the seventh time interval 218 as samples based on the seventh time interval 218 being selected due to the sixth time interval being skipped.

The captured samples from the selected time intervals may be stored in memory (such as the first memory 116 (FIG. 1) and/or the second memory 120 (FIG. 1)). The captured samples may be utilized for security assurance procedures.

FIG. 3 illustrates an example captured sample representation 300 in accordance with some embodiments. In particular, the captured sample representation 300 represents samples that may have been captured from the sampling arrangement 200 (FIG. 2).

The captured sample representation 300 comprises a table that shows samples that have been captured. The columns of the table represent time intervals in which samples may have been captured. For example, the columns include a first column 302 that represents the second time interval 208 (FIG. 2), a second column 304 that represents the fourth time interval 212 (FIG. 2), a third column 306 that represents the sixth time interval 216 (FIG. 2), and a fourth column 308 that represents the seventh time interval 218 (FIG. 2).

As can be seen from the table, the first column 302 includes five samples (shown as Samp-1, Samp-2, Samp-3, Samp-4, and Samp-5), which indicates that five samples were captured during the second time interval 208. The second column 304 includes two samples (shown as Samp-1 and Samp-2), which indicates that two samples were captured during the fourth time interval 212. The third column 306 includes zero samples, which indicates that no samples were captured during the sixth time interval 216. The fourth column 308 includes three samples (shown as Samp-1, Samp-2, and Samp-3), which indicates that three samples were captured during the seventh time interval 218. The samples illustrated may have been stored and may be utilized for security assurance operations.

FIG. 4 illustrates an example sampling estimation representation 400 in accordance with some embodiments. For example, the sampling estimation representation 400 illustrates an example estimation of communications to be received by a sampling system (such as the sampling system 106 (FIG. 1)) during time intervals of a time window. The sampling system, or some portion thereof, may perform the estimation of communications to be received for determining a k value to be utilized for sampling, as described throughout the disclosure.

In the illustrated embodiment, the sampling system may be estimating numbers of communications to be received during time intervals of a time window occurring on May 22, 2023. The time window may extend from 1 AM to 12 PM on May 22, 2023, where the time window is segmented into one hour time intervals. To perform the estimation, the sampling system may identify one or more previous time intervals predicted to have similar traffic profiles as that of the time intervals for which estimation is being performed. For example, the sampling system may identify one or more previous time intervals corresponding to the same times of day, the same days of a week, the same type of a day (such as being a holiday, weekday, and/or weekend), the same holiday, and/or another time that is predicted to have similar traffic profiles to the time intervals for which estimation is being performed.

In the illustrated embodiment, the sampling system may identify a first previous time interval set 402 and a second previous time interval set 404 to be utilized for estimating the communications to be received during the time window occurring on May 22, 2023. The first previous time interval set 402 is a time window occurring on May 8, 2023 from 1 AM to 12 PM with the time window segmented into one hour time intervals. The second previous time interval set 404 is a time window occurring on May 15, 2023 from 1 AM to 12 PM with the time window segmented into one hour time intervals. Accordingly, the first previous time interval set 402 and the second previous time interval set 404 are on a same day of the week and during a same time of day as the time intervals for which the amount of communications are being estimated.

The sampling system may estimate a number of communications to be received in the time intervals of the time window based on the identified previous time intervals. For example, the sampling system may determine an estimated time interval set 406 based on the first previous time interval set 402 and the second previous time interval set 404 in the illustrated embodiment. In the illustrated embodiment, the sampling system may estimate the number of communications for a time interval within the estimated time interval set 406 based on corresponding time intervals from the first previous time interval set 402 and the second previous time interval set 404. For example, the sampling system may average a number of communications from a first time interval 408 of the first previous time interval set 402 corresponding to 1 AM with a number of communications from a first time interval 410 of the second previous time interval set 404 corresponding to 1 AM to produce an estimate of the amount of communications to be received in a first time interval 412 of the estimated time interval set 406 at 1 AM. In particular, the sampling system may average the 15 communications received in the first time interval 408 of the first previous time interval set 402 with the 5 communications received in the first time interval 410 of the second previous time interval set 404 to produce an estimate of 10 communications to be received in the first time interval 412 of the estimated time interval set 406. The sampling system may repeat the estimation for all of the time intervals within the estimated time interval set 406.

While the sampling system identifies two previous time interval sets in the illustrated embodiment, it should be understood that the sampling system may identify one or more previous time interval sets in other embodiments. Further, while the sampling system utilizes all of the identified previous time interval sets to produce the estimate in the illustrated embodiment, it should be understood that the sampling system may utilize less than all of the identified previous time interval sets in other embodiments. Additionally, while the sampling system averages the amounts of communications from the identified previous time interval sets in the illustrated embodiments, it should be understood that the sampling system may utilize the identified previous time interval sets in different manners for estimating the amount of communications to be received within the time interval in other embodiments, such as utilizing the minimum amount of communications received in the previous corresponding time intervals, utilizing the maximum amount of communications received in the previous corresponding time intervals, weighting the amount of communications received in the previous corresponding time intervals, selecting a certain portion of the previous corresponding time intervals to be utilized for estimating the communications for the time interval, and/or utilizing the amounts of communications from the previous corresponding time intervals in other manners.

Figure 5:
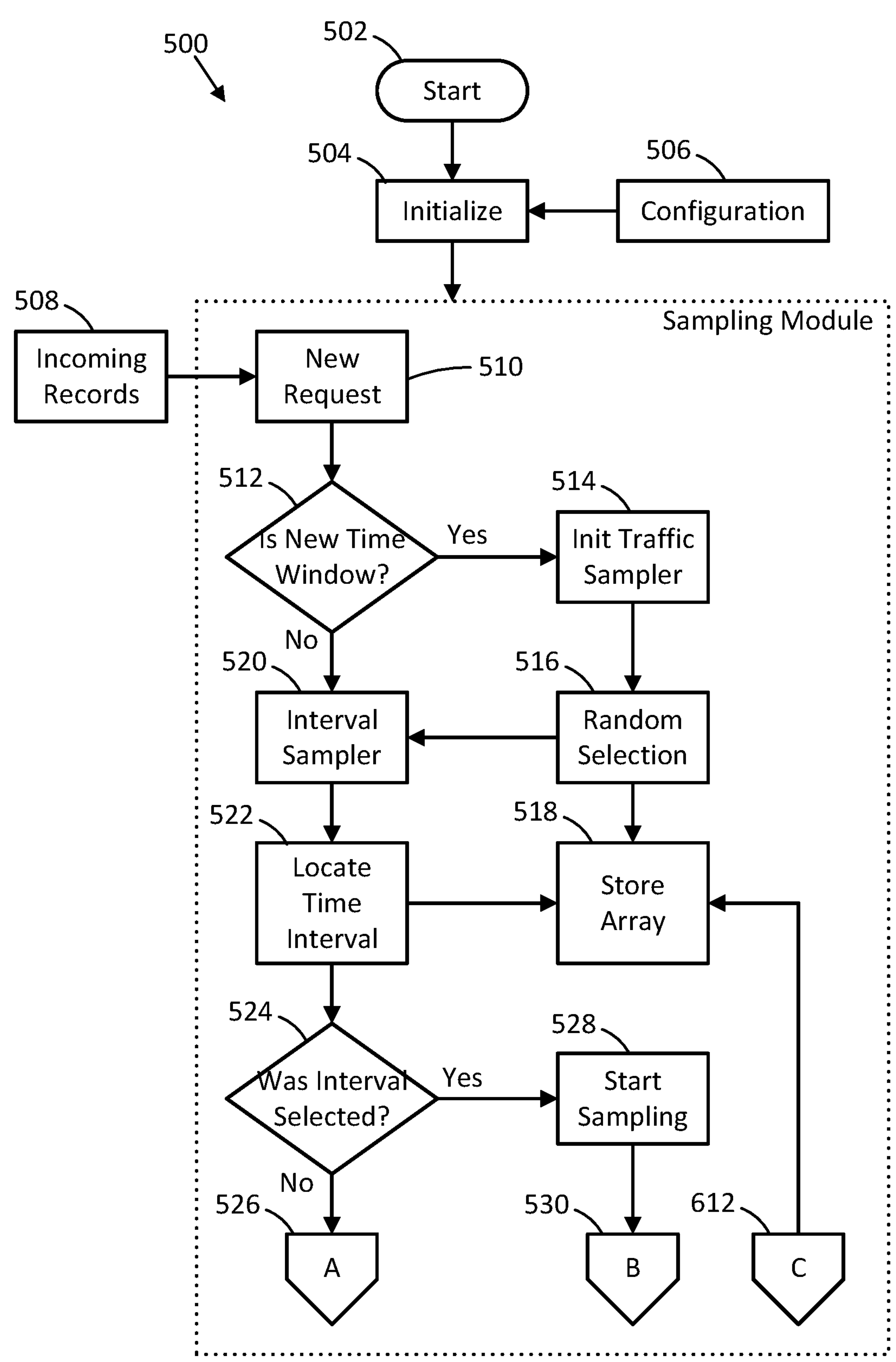
FIG. 5 illustrates a first portion of a flow chart showing an example procedure that may be performed as part of a sampling operation in accordance with some embodiments.
Figure 6:
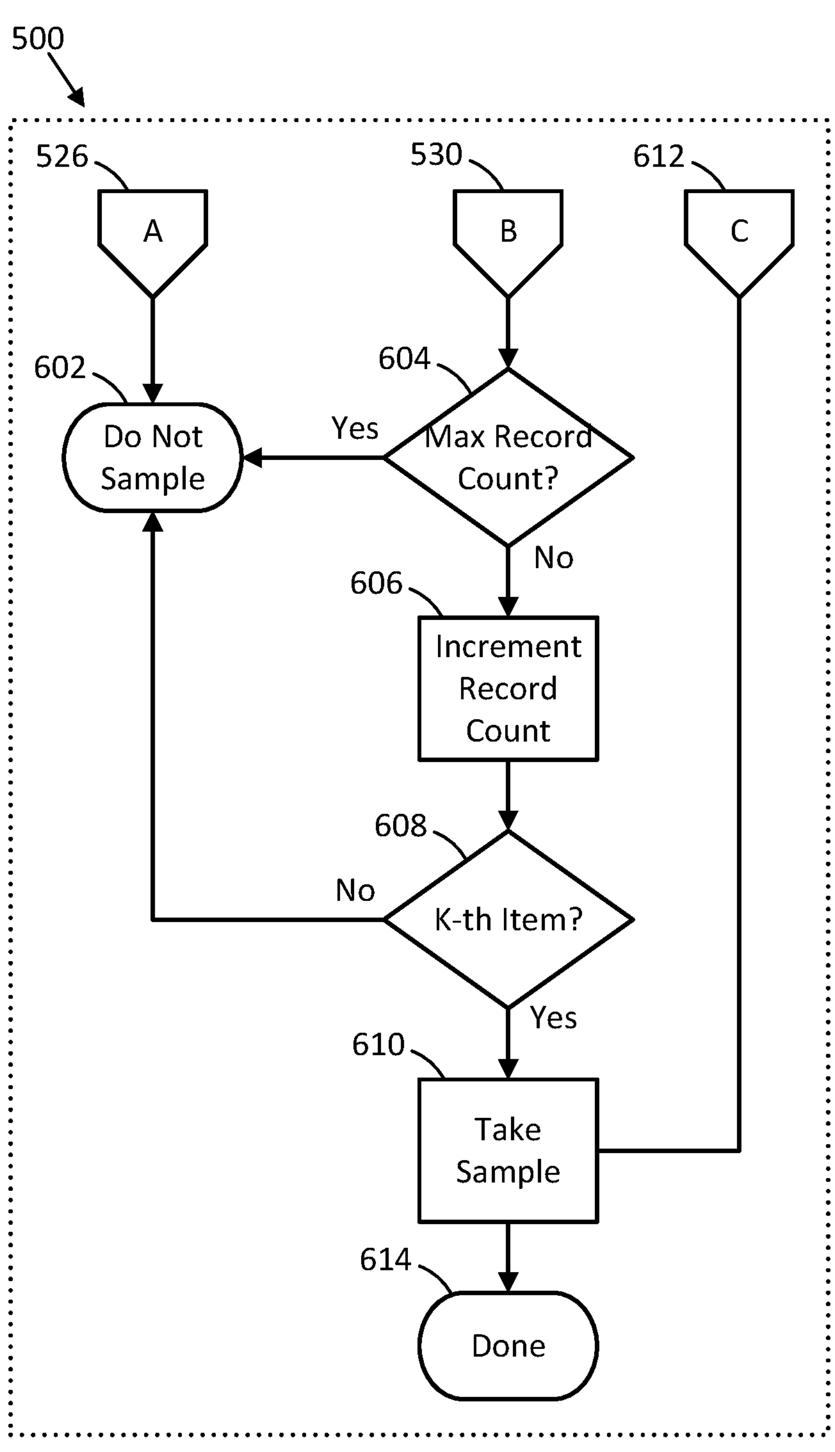
FIG. 6 illustrates a second portion of the flow chart showing the example procedure in accordance with some embodiments.

FIG. 5 illustrates a first portion of a flow chart showing an example procedure 500 that may be performed as part of a sampling operation in accordance with some embodiments. FIG. 6 illustrates a second portion of the flow chart showing the example procedure 500 in accordance with some embodiments. The procedure 500 may be performed by a sampling system, such as the sampling system 106 (FIG. 1).

The procedure 500 may initiate at a start 502. The procedure 500 may proceed with initialization in 504. For example, the sampling system may be initialized in 504. The sampling system may be initialized with a configuration 506. The configuration 506 may include the window duration, the total interval count, the chosen interval count, the success maximum count, the fail maximum count, and/or the skip maximum count.

The sampling system may receive incoming records 508. The incoming records 508 may comprise communications received from the sampling system from a data source (such as the data source 102 (FIG. 1)). The sampling system may identify a new request 510 from the incoming records 508. The new request 510 may be a communication from the communications received as the incoming records 508. The new request 510 may further include an indication of a time corresponding to the communication.

In 512, the sampling system may determine whether the new request 510 is part of a new time window. For example, the sampling system may determine, based on the time corresponding to the new request 510, whether the new request 510 is a first request received in a new time window. The sampling system may determine a starting time and an ending time of a time window and determine whether the new request 510 is a first request received between the starting time and the ending time. If sampling system determines that the new request 510 is the first request received between the starting time and the ending time, the sampling system may determine that a new time window is to be established. If the sampling system determines that one or more other requests were received between the starting time and the ending time prior to the new request 510, the sampling system may determine that a new time window is not to be established.

If the sampling system determines a new time window is to be established, the sampling system may initialize a traffic sampler record for the time window in 514. Initializing the traffic sample record may include defining the time intervals for the time window. For example, a time interval array may be defined for the time window, where the time interval array includes time intervals of the same size.

The procedure 500 may proceed from 514 to 516. In 516, the sampling system may randomly select time intervals, from the time intervals defined in 514, for sampling. For example, the sampling system may randomly select a predefined percentage of intervals to be sampled. In 518, the sampling system may store the time interval array and/or the selected time intervals. Further, the randomly selected intervals may be provided to an interval sampler 520.

If the sampling system determines that a new time window is not to be established in 512, the procedure 500 may proceed to the interval sampler 520. In 522, the sampling system may locate a current time interval within the array of time intervals. For example, the sampling system may determine a time interval corresponding to the new request 510 based on the time corresponding to the new request 510. The sampling system may request the interval array information stored in 518 for locating the time interval in the array of time intervals in 522.

In 524, the sampling system may determine whether the time interval is a selected time interval for sampled. For example, a current interval record for the time interval corresponding to the new request may be utilized to determine whether the time interval is to be sampled based on the random selection in 516.

If the sampling system determines that the time interval is not a selected time interval in 524, the procedure 500 may proceed to 602 in FIG. 6 via 526. In 602, the sampling system may determine that the new request 510 is not to be sampled.

If the sampling system determines that the time interval is a selected time interval in 524, the sampling system may start a sampling process in 528. For example, the sampling system may perform procedures to determine whether the new request 510 is to be sampled. The sampling system may start the sampling process and keep track of the sample counts in 528.

The procedure 500 may proceed from 526 to 604 in FIG. 6 via 530. In 604, the sampling system may determine whether a maximum record count has been reached for the time interval. For example, the sampling system may compare a current record count to a maximum record count. The current record count may be a count of a number of requests received by the sampling system. If the sampling system determines that the current record count is equal to or greater than the maximum record count, the procedure may proceed to 602 where the sampling system determines that the new request is not to be sampled.

If the sampling system determines that the current record count is less than the maximum record count, the procedure 500 may proceed to 606. In 606, the sampling system may increment the record count.

In 608, the sampling system may determine whether the new request 510 is the K-th item. For example, the sampling system may determine whether the new request 510 is the K-th item based on the record count. If the sampling system determines that the new request 510 is not the K-th item, the sampling system may determine that the new request 510 is not to be selected for sampling. In this instance, the procedure 500 may proceed to 602 where the new request 510 is not sampled.

If the sampling system determines that the new request 510 is the K-th item, the sampling system may determine that the new request 510 is to be selected to be sampled. In this instance, the procedure 500 may proceed to 610. In 610, the new request 510 may be sampled. Further, an update sample record count may be updated in 610. The sampling system may update the sample record count stored in 518 via 612. After taking the sample, the procedure 500 may proceed to 614 where the procedure 500 is completed for the new request 510. The procedure 500 may be repeated for new requests received by the sampling system.

Figure 7:
FIG. 7 illustrates an example procedure for sampling data for validation in accordance with some embodiments.
Figure 7:
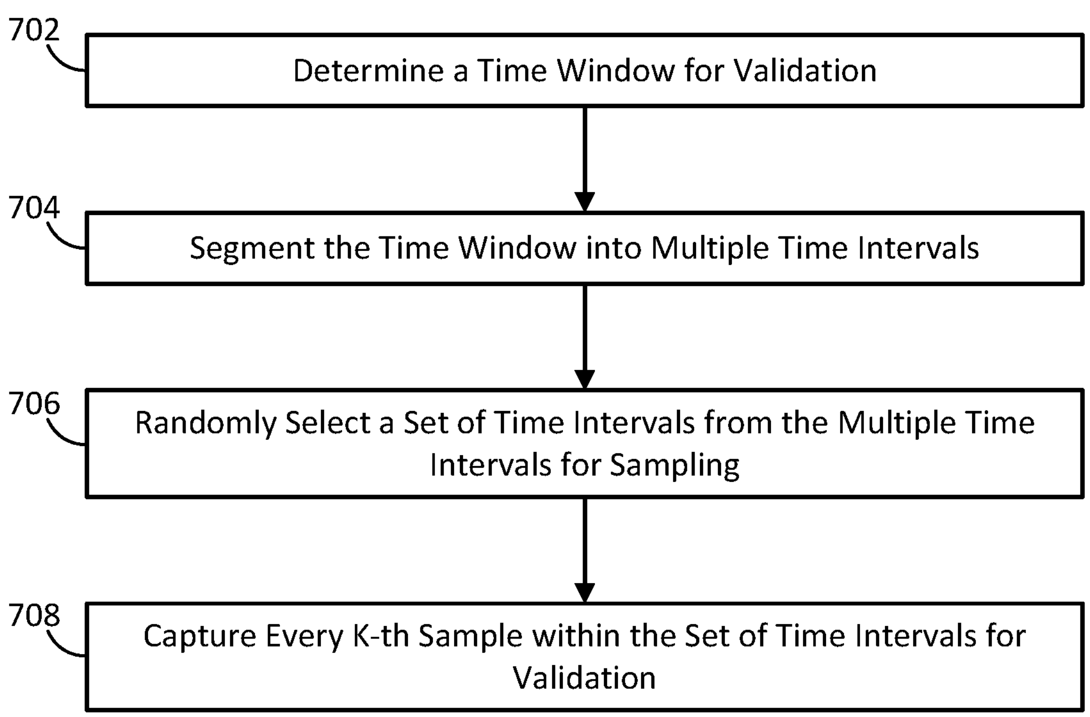

FIG. 7 illustrates an example procedure 700 for sampling data for validation in accordance with some embodiments. The data sampled may be incoming communications to produce samples used for validation. The samples may be utilized for validating that a user transmitting the communications is authorized to access a system. The procedure 700 may be performed by a system, such as the IaaS architecture of FIG. 8, the IaaS architecture of FIG. 9, the IaaS architecture of FIG. 10, the IaaS architecture of FIG. 11, and/or the computer system 1200 (FIG. 12).

In 702, the system may determine a time window for validation. The time window may be a period of time for which validation is desired to be performed for communications received by the system.

In 704, the system may segment the time window into multiple time intervals. In some embodiments, segmenting the time window may include determining a number of equally sized time intervals into which the time window is to be segmented. Further, segmenting the time window may include segmenting the time window into the number of equally sized time intervals to produce the multiple time intervals.

In 706, the system may randomly select a set of time intervals from the multiple time intervals for sampling. In some embodiments, randomly selecting the set of time intervals may include determining a threshold percentage of the multiple time intervals to be selected. Further, randomly selecting the set of time intervals may include randomly selecting a percentage of the multiple time intervals to be included in the set of time intervals. The percentage of the multiple time intervals selected is greater than or equal to the threshold percentage.

In 708, the system may capture every k-th sample within the set of time intervals for validation. In some embodiments, every k-th sample is captured in real time for processing. The samples captured by the capturing of every k-th sample may be utilized for a security assurance determination.

In some embodiments, the system may determine k values for each time interval within the set of time intervals. The k values may define the k-th sample for capturing. In some embodiments, determining the k values may include determining historical data transaction amounts corresponding to each time interval within the set of time intervals. The k values for each time interval may be determined based on the corresponding historical data transaction amounts.

In some embodiments, the system may determine a number of samples to be captured to provide a confidence level for validation. Further, the system may determine k values for each time interval within the set of time intervals based on the determined number of samples in some embodiments. The k values may define the k-th sample for capturing. In some of these embodiments, the number of samples may be determined to be $$n' = \frac{n}{1 + \frac{Z^2 \hat{p}(1-\hat{p})}{\varepsilon^2 N}},$$

wherein n' is the number of sample, wherein n is equal to $$\frac{z^2 \hat{p}(1-\hat{p})}{\varepsilon^2},$$

z is a defined z score, ε is a defined margin of error, N is a population size, and p̂ is a population proportion. In some of these embodiments, the number of samples may be determined to be $$n = \frac{z^2 \hat{p}(1-\hat{p})}{\varepsilon^2},$$

wherein n is the number of samples, ε is a defined margin of error, and p̂ is a population proportion.

In some embodiments, the system may determine k values for each time interval within the set of time intervals using $$k = \left\lceil \frac{e}{\left(\frac{d}{i*p}\right)} \right\rceil,$$

wherein e is an estimated population within a time interval, d is a desired sample size within the time window, i is an amount of intervals per window, and p is a percentage of the multiple time intervals selected for the set of time intervals.

In some embodiments, the system may determine that a number of samples captured within a first time interval of the set of time intervals is less than or equal to a threshold number of samples. The system may capture every k-th sample within a second time interval for validation in some embodiments. The second time interval may be a next subsequent unselected time interval within the time window from the first time interval. In some embodiments, the system may determine a k value for the second time interval, the k value defining the k-th sample for the capturing within the second time interval. Determining the k value may include determining a first historical data transaction amount corresponding to the second time interval, wherein the k value for the second time interval may be determined based on the first historical data transaction amount.

In some embodiments, the system may determine a corresponding processor to which to direct each sample captured. The system may direct each sample captured to the determined corresponding processor for processing.

While FIG. 7 may arguably imply an order of the operations of the procedure 700, it should be understood that one or more of the operations may be performed in a different order and/or one or more of the operations may be performed concurrently in embodiments. Further, it should be understood that one or more of the operations may be omitted from and/or one or more additional operations may be added to the procedure 700 in other embodiments.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
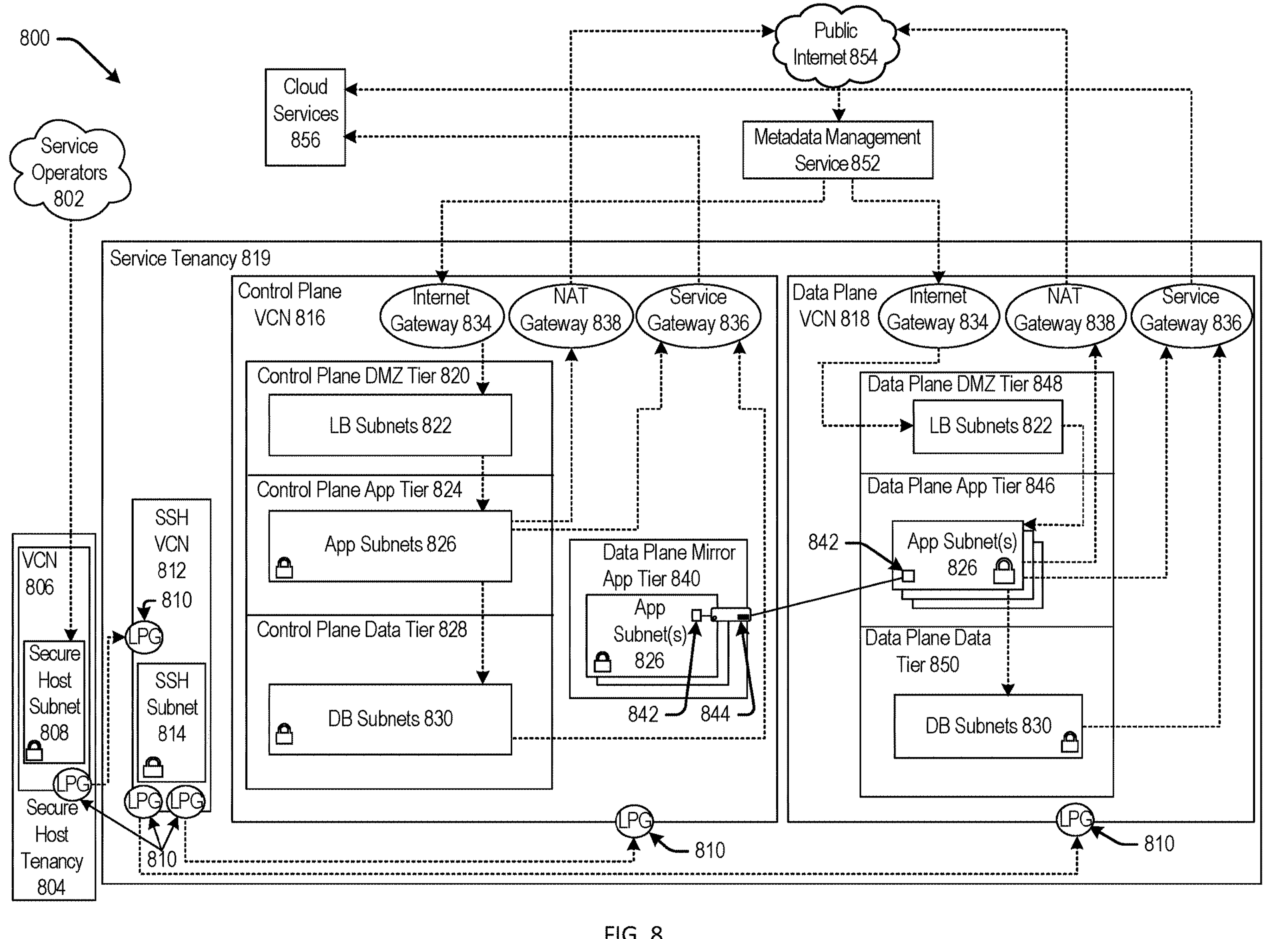
FIG. 8 is a block diagram illustrating an example pattern of an IaaS architecture, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
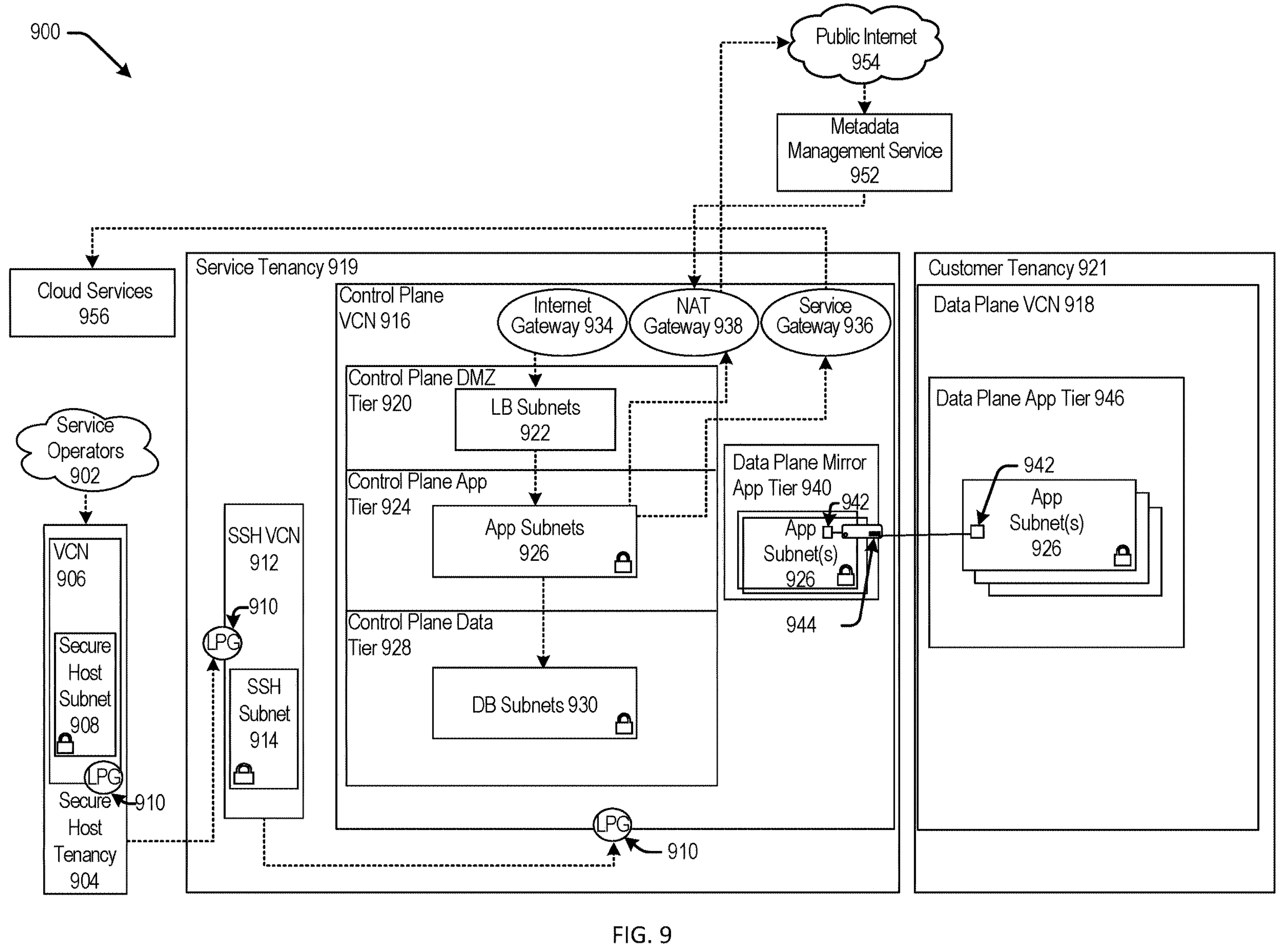
FIG. 9 is a block diagram illustrating another example pattern of an IaaS architecture, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 6," may be located in Region 1 and in "Region 2." If a call to Deployment 6 is made by the service gateway 936 contained in the control plane VCN 916 located in Region 1, the call may be transmitted to Deployment 6 in Region 1. In this example, the control plane VCN 916, or Deployment 6 in Region 1, may not be communicatively coupled to, or otherwise in communication with, Deployment 6 in Region 2.

Figure 10:
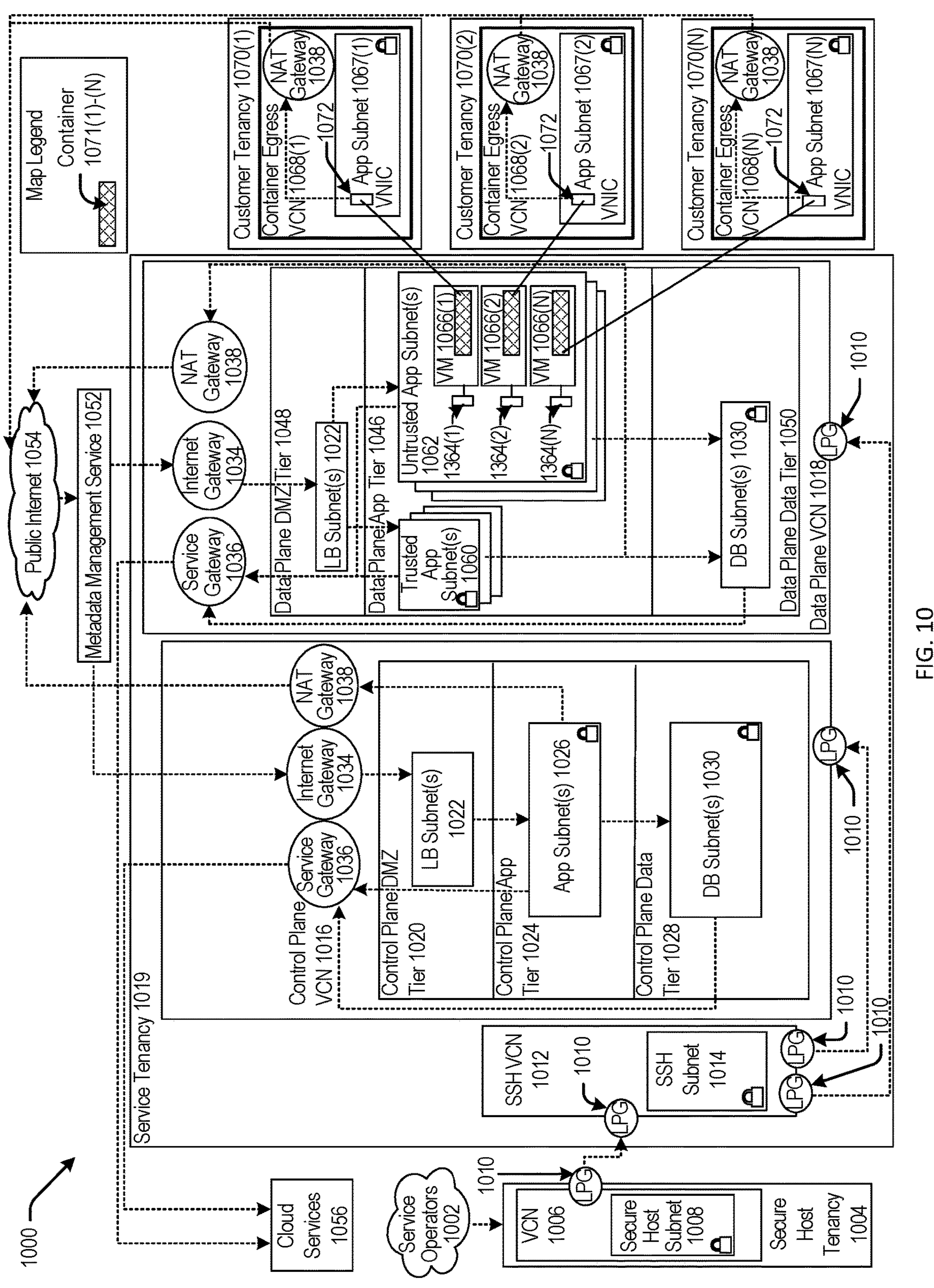
FIG. 10 is a block diagram illustrating another example pattern of an IaaS architecture, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
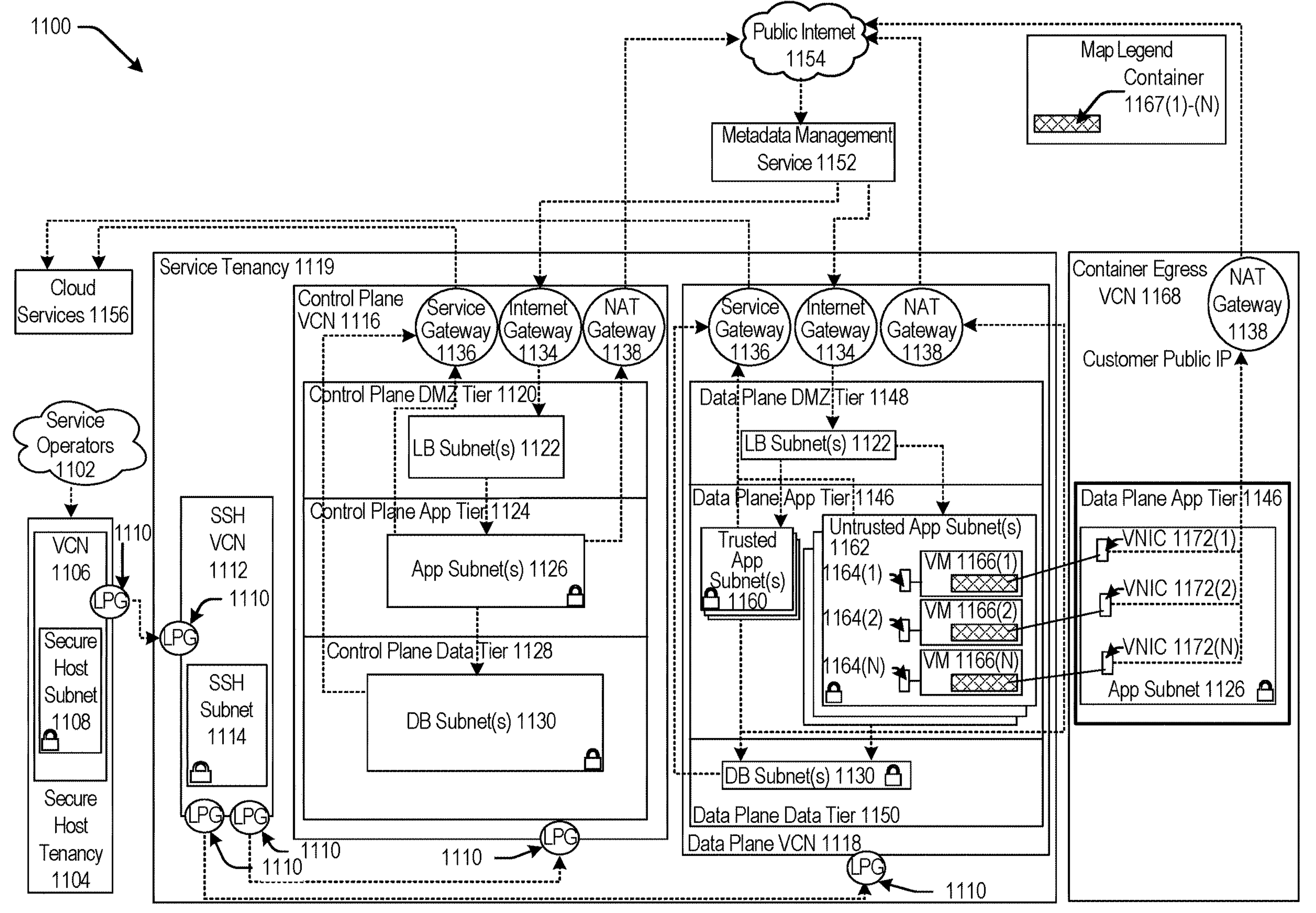
FIG. 11 is a block diagram illustrating another example pattern of an IaaS architecture, according to at least one embodiment.
Figure 12:
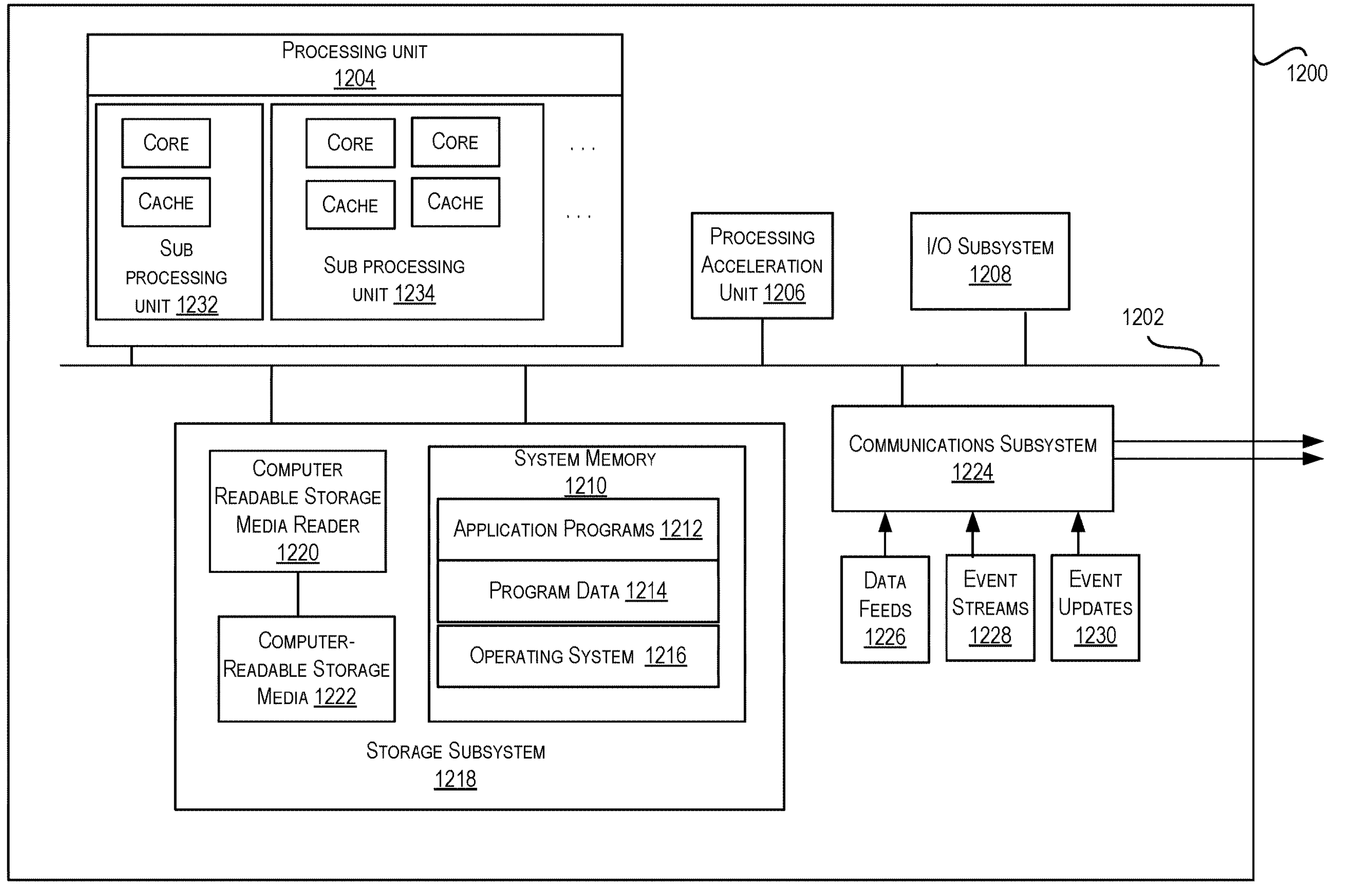
FIG. 12 illustrates an example computer system, in which various embodiments may be implemented.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or May have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices May include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1002.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments May become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

determining, by a sampling system and for security evaluation, a time window for validation of communications received by a computer system, wherein the sampling system is implemented using one or more computing nodes;

segmenting, by the sampling system, the time window into multiple time intervals;

randomly selecting, by the sampling system, a set of time intervals from the multiple time intervals for sampling;

capturing, by the sampling system, every k-th communication of the communications received by the computer system within the selected set of time intervals; and performing one or more security assurance procedures with the captured communications, the performing comprising verifying that a source of a captured communication, of the captured communications, is authorized to access the computer system.

2. The method of claim 1, further comprising:

determining, by the sampling system, k values for each time interval within the selected set of time intervals, the k values defining the k-th communication for the capturing.

3. The method of claim 2, wherein determining the k values comprise:

determining historical data transaction amounts corresponding to each time interval within the selected set of time intervals, wherein the k values for each time interval are determined based on the corresponding historical data transaction amounts.

4. The method of claim 1, wherein randomly selecting the set of time intervals comprises:

determining a threshold percentage of the multiple time intervals to be selected;

randomly selecting a percentage of the multiple time intervals to be included in the set of time intervals, wherein the percentage of the multiple time intervals selected is greater than or equal to the threshold percentage.

5. The method of claim 1, wherein segmenting the time window comprises:

determining a number of equally sized time intervals into which the time window is to be segmented; and segmenting the time window into the number of equally sized time intervals to produce the multiple time intervals.

6. The method of claim 1, wherein every k-th communication is captured in real time for processing.

7. The method of claim 1, further comprising:

determining, by the sampling system, a corresponding processor to which to direct each communication captured; and directing each communication captured to the determined corresponding processor for processing.

8. The method of claim 1, further comprising:

determining, by the sampling system, a number of communications to be captured to provide a confidence level for the validation; and determining, by the sampling system, k values for each time interval within the set of time intervals based on the determined number of communications, the k values defining the k-th communication for capturing.

9. The method of claim 8, wherein the number of communications is determined to be $$n' = \frac{n}{1 + \frac{Z^2 \hat{p}(1-\hat{p})}{\varepsilon^2 N}},$$

wherein n' is the number of communications, wherein n is equal to $$\frac{z^2 \hat{p}(1-\hat{p})}{\varepsilon^2},$$

z is a defined z score, ε is a defined margin of error, N is a population size, and p̂ is a population proportion.

10. The method of claim 8, wherein the number of communications is determined to be $$n = \frac{z^2 \hat{p}(1-\hat{p})}{\varepsilon^2},$$

wherein n is the number of communications, ε is a defined margin of error, and p̂ is a population proportion.

11. The method of claim 1, further comprising:

determining, by the sampling system, that a number of communications captured within a first time interval of the set of time intervals is less than or equal to a threshold number of communications; and capturing, by the sampling system, every k-th communication within a second time interval for validation, the second time interval being a next subsequent unselected time interval within the time window from the first time interval.

12. The method of claim 11, further comprising:

determining, by the sampling system, a k value for the second time interval, the k value defining the k-th communication for the capturing with the second time interval.

13. The method of claim 12, wherein determining the k value comprises determining a first historical data transaction amount corresponding to the second time interval, wherein the k value for the second time interval is determined based on the first historical data transaction amount.

14. The method of claim 1, further comprising:

determining, by the sampling system, k values for each time interval within the selected set of time intervals using $$k = \left\lceil \frac{e}{\left(\frac{d}{i * p}\right)} \right\rceil,$$

wherein e is an estimated population within a time interval, d is a desired sample size within the time window, i is an amount of the multiple time intervals, and p is a percentage of the multiple time intervals selected for the selected set of time intervals.

15. The method of claim 1, wherein communications captured by the capturing of every k-th communication are utilized for a security assurance determination.

16. One or more computer-readable media having instructions stored thereon, wherein the instructions, when executed by a sampling system, cause the sampling system to:

determine, for security evaluation, a time window for validation of communications received by a computer system, wherein the sampling system is implemented using one or more computing nodes;

segment the time window into multiple time intervals;

randomly select a set of time intervals from the multiple time intervals for sampling;

capture every k-th communication of the communications received by the computer system within the selected set of time intervals; and perform one or more security assurance procedures with the captured communications, the performing comprising verifying that a source of a captured communication, of the captured communications, is authorized to access the computer system.

17. The one or more computer-readable media of claim 16, wherein the instructions, when executed by the sampling system, further cause the sampling system to:

determine k values for each time interval within the selected set of time intervals, the k values defining the k-th communication for the capturing.

18. The one or more computer-readable media of claim 17, wherein to determine the k values comprises to determine historical data transaction amounts corresponding to each time interval within the selected set of time intervals, wherein the k values for each time interval are determined based on the corresponding historical data transaction amounts.

19. A sampling system, comprising:

memory to store samples; and one or more processors coupled to the memory, the one or more processors to:

determine, for security evaluation, a time window for validation of communications received by a computer system, wherein the sampling system is implemented using one or more computing nodes;

segment the time window into multiple time intervals;

randomly select a set of time intervals from the multiple time intervals for sampling;

capture every k-th communication of the communications received by the computer system within the selected set of time intervals; and performing one or more security assurance procedures with the captured communications, the performing comprising verifying that a source of a captured communication, of the captured communications, is authorized to access the computer system.

20. The sampling system of claim 19, wherein to randomly select the set of time intervals comprises to:

determine a threshold percentage of the multiple time intervals to be selected;

randomly select a percentage of the multiple time intervals to be included in the set of time intervals, wherein the percentage of the multiple time intervals selected is greater than or equal to the threshold percentage.

* * * * *